(12) United States Patent
Wiedeman et al.

(10) Patent No.: US 7,597,395 B2
(45) Date of Patent: Oct. 6, 2009

(54) VEHICLE SEAT

(75) Inventors: Michael Wiedeman, Manhattan Beach, CA (US); John A. Frye, San Pedro, CA (US); Frank D. Moburg, Whittier, CA (US); Michael Tsay, Irvine, CA (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 1045 days.

(21) Appl. No.: 10/035,334

(22) Filed: Jan. 4, 2002

(65) Prior Publication Data

US 2003/0127892 A1 Jul. 10, 2003

(51) Int. Cl.
*A47C 15/00* (2006.01)

(52) U.S. Cl. .......................... 297/248; 296/64

(58) Field of Classification Search ............. 297/248, 297/452.22, 452.42; 296/63, 68.1, 64; 105/345
See application file for complete search history.

(56) References Cited

U.S. PATENT DOCUMENTS

| 2,833,554 | A | | 5/1958 | Ricordi |
| 2,891,804 | A | | 6/1959 | Frayne et al. |
| 3,762,505 | A | | 10/1973 | Morse |
| 5,868,452 | A | * | 2/1999 | Grieger .............. 296/68.1 X |
| 6,568,735 | B1 | * | 5/2003 | Lohr et al. .............. 296/63 X |

FOREIGN PATENT DOCUMENTS

| DE | 0 635 405 A1 | 7/1994 |
| EP | 0 635 405 A1 | 1/1995 |
| EP | 1 060 944 A1 | 12/2000 |
| JP | 61-107340 | 7/1986 |
| JP | 07-061265 | 3/1995 |
| JP | 2000-023776 | 1/2000 |
| WO | WO 94/26553 | 11/1994 |
| WO | WO 97/17223 | 5/1997 |

OTHER PUBLICATIONS

Search Report.
Japanese Office Action dated Feb. 26, 2008, Application No. 2003-557859.

* cited by examiner

*Primary Examiner*—Anthony D Barfield
(74) *Attorney, Agent, or Firm*—Westerman, Hattori, Daniels & Adrian, LLP.; Mark E. Duell (57) ABSTRACT

A seat for a vehicle and more particularly a front seat for a vehicle includes a central pillar extending from the floor to the roof of the vehicle, and a center support extending forwardly from the central pillar. A lower rib extends laterally from the center support and supports a seat bottom fixed thereto. Primary and secondary intermediate ribs also extend laterally from the central pillar. A seat back is fixed to and supported by the primary and secondary intermediate ribs. Also, an upper rib is provided which extends laterally from the central pillar above the intermediate ribs. A headrest is fixed to and supported by the upper rib.

27 Claims, 8 Drawing Sheets

VEHICLE SEAT

BACKGROUND OF THE INVENTION

1. Field of the Invention

The instant invention is directed to seats for a vehicle. More specifically, it is directed to seats supported from a central pillar extending from the floor to the roof of a motor vehicle.

2. Description of the Related Art

For many years, seats in a vehicle, or more specifically in a motor vehicle, have been mounted on the floor of the vehicle. Such seats are generally mounted on tracks to be adjustable. A seat frame is movable along the tracks to allow for different sizes of occupants. The seat frame is built up with various levels of springing, cushioning and then covering. Coil and other types of springs have been used to provide springing, while various types of foam are used to provide the cushioning feature. Many types of woven fabrics, as well as leather and vinyl have been used for covering the seats.

Despite whatever types of materials have been used for the springing, cushioning or covering of the vehicle seat, the method of mounting the seat on the vehicle floor has been the predominant method of mounting seats in a vehicle. It is most common to mount each front seat so that it is adjustable along two tracks mounted on the vehicle floor, at the outer edges of the seat. This allows a passenger behind the seat to put his feet under the center portion (between the tracks) of the seat ahead of him. However, there is rarely a significant amount of room for such a passenger's feet. Another approach has been to mount the seat on the vehicle floor, so that the tracks and adjustment mechanism is in the center part of the seat, rather than at the outer edges. This enables the passenger behind the seat to put his feet under the seat, but at the outer edges rather than at the center portion. Still this does not allow substantial room for the passenger's feet.

SUMMARY OF THE INVENTION

The instant invention solves some of the problems described above with regard to conventional seating. More specifically, the instant invention is directed to a seat (or a pair of seats) for a vehicle, including a central pillar extending from a floor to a roof of the vehicle, a center support extending forwardly from the central pillar, and a plurality of ribs extending from the central pillar to support the seats. Specifically, a lower rib extends laterally from the center support to support a seat bottom, while one or two intermediate ribs extend laterally from the central pillar to support a seat back. Also, an upper rib may be provided which extends laterally from the central pillar and supports a headrest fixed thereto. When a pair of seats in used, each is located on an opposite side of the central pillar. Thus, the central pillar provides support for passengers sitting in both seats. While the preferred use of the seats in accordance with the invention is for front seats, the seats may be used anywhere in a vehicle or automobile. They may be used for second or third row seats in an automobile, an SUV, a van, a truck, or any other appropriate vehicle.

The seats in accordance with the instant invention are supported from the central pillar rather than in the conventional way, from the floor of the vehicle, or from the B-pillar. By supporting the seats from the central pillar, additional floor space is obtained under the seats. This improves the foot room for passengers sitting behind the seats in that there are no supports for the seats on the floor under the seats. In fact, the support ribs that support the seatback and the headrest of a seat also provide protection from items or parcels that may tumble forward from the rear portion of the vehicle. Grab handles on the outer edge of the seat backs are helpful for the rear passengers to enter and exit from the vehicle. Also, and the emergency brake is integrated with the seats of the instant invention by being supported by the center support which is supported by the central pillar. The emergency brake extends forwardly from the center support, between the front seats of the vehicle.

DETAILED DESCRIPTION OF THE INVENTION

Figure 1:
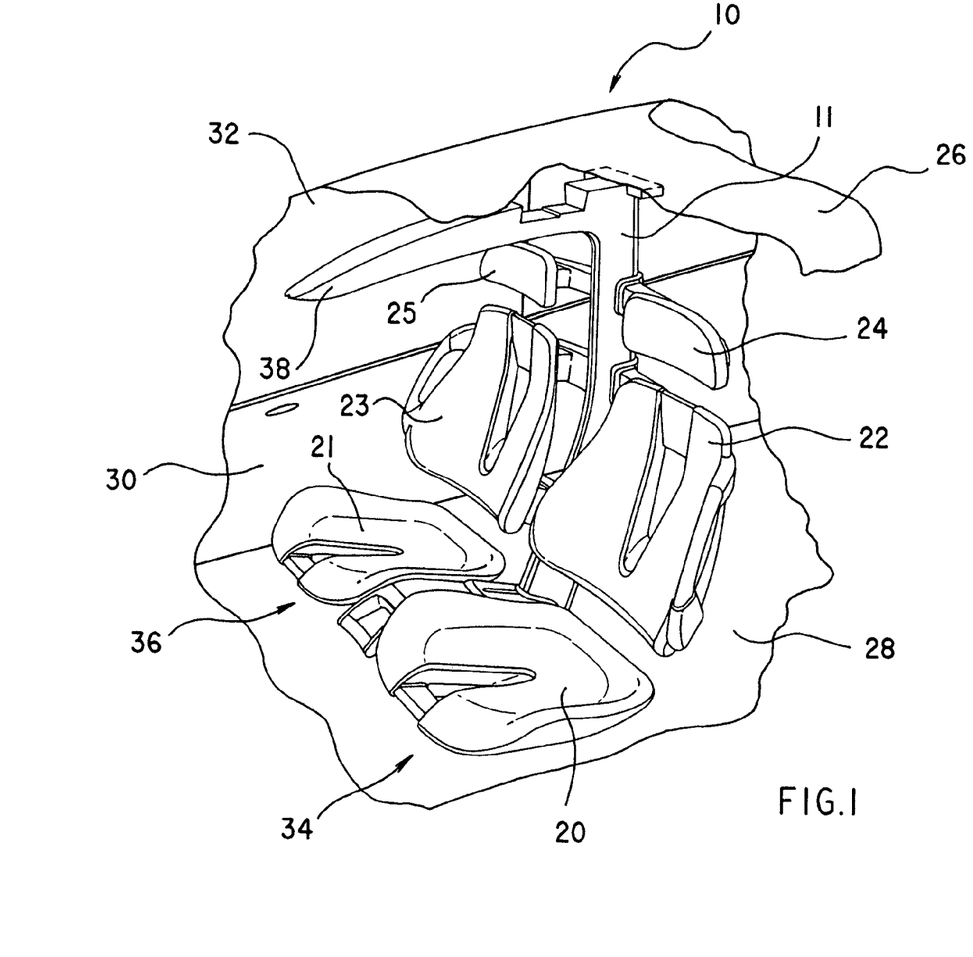
FIG. 1 is a perspective view of the seats for a motor vehicle in accordance with the instant invention, wherein the seats are illustrated in a partially cut away vehicle.

FIG. 1 illustrates a front perspective view of the seats in accordance with the instant invention, as used in a vehicle 10, shown in cut away. Vehicle 10 is illustrated in a cutaway view and has a roof 26, floor 28, a door 30 and a window 32.

A left vehicle seat generally indicated at 34 and a right vehicle seat generally indicated at 36 are both supported by a central pillar 11. Central pillar 11, as better seen in FIGS. 5 and 7, extends between and is supported by roof 26 and floor 28. Left vehicle seat 34 includes a left seat bottom 20, a left seat back 22, and a left headrest 24. Right vehicle seat 36 includes a right bottom seat 21, a right seat back 23 and a right headrest 25.

The vehicle seats in accordance with the instant invention are preferably used as front seats in a motor vehicle and more particularly as front seats in an automobile. However, they could also easily be used as rear seats or third row seats in an automobile, an SUV, a van, a truck, or other types of vehicles. Vehicle seats 34 and 36 will be described in detail with reference to FIGS. 2-7. As stated above, vehicle seats 34 and 36, in accordance with the instant invention, are preferably used as front seats in an automobile. As illustrated in FIG. 1, central pillar 11 is located substantially at the center line of the automobile and generally between the B-pillars, although it may also be positioned in front of or behind the B-pillars. Central pillar 11 has an upper portion 11a and a support member 38 which extends forwardly from upper portion 11a. Upper portion 11a and support member 38 are fixed to the roof of the vehicle. Central pillar 11 also has a support flange 42 to provide additional surface area and support for fixing the upper portion 11a of central pillar 11 to roof 26.

Figure 3:
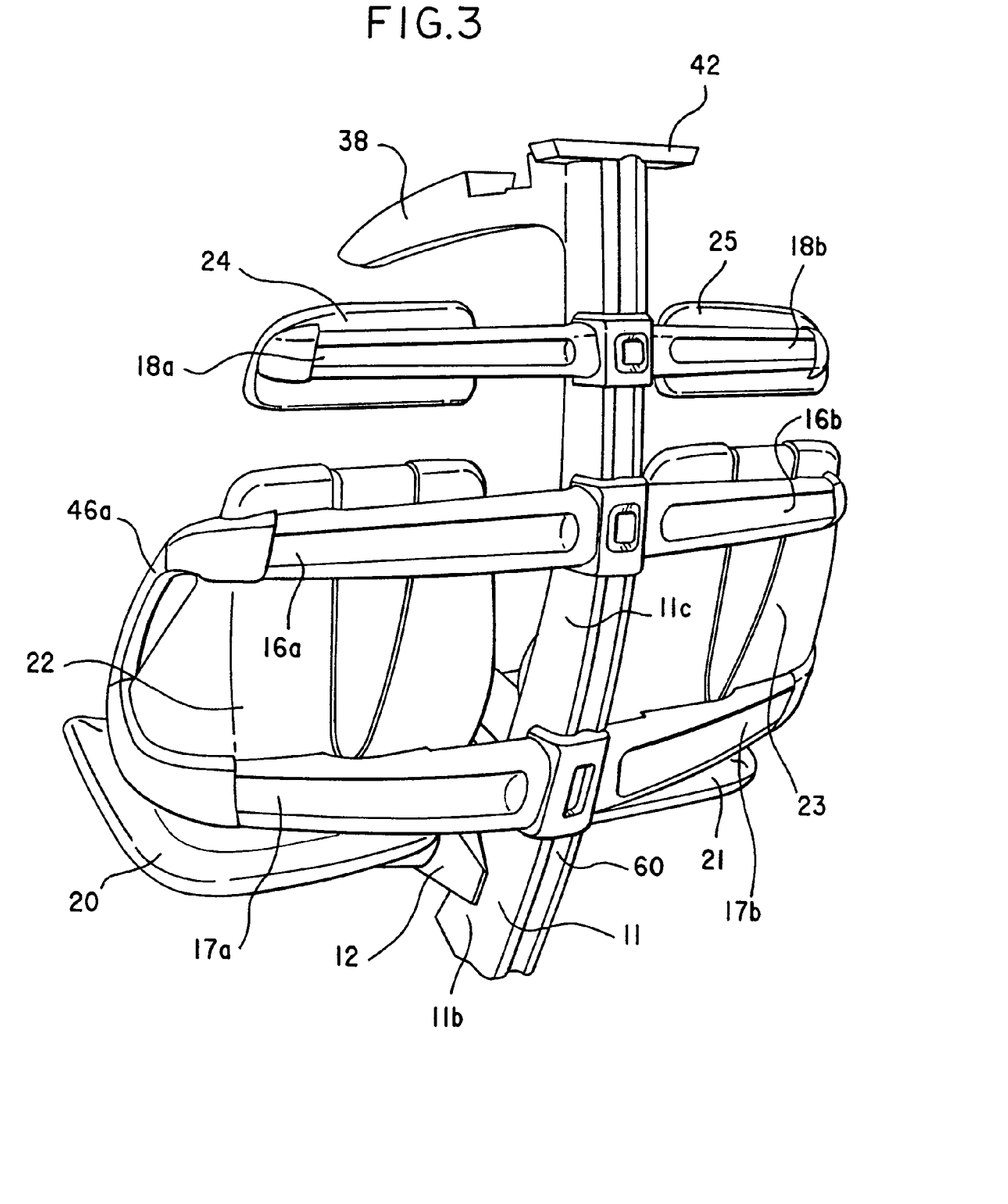
FIG. 3 is a rear perspective view of the seats of FIG. 1.
Figure 4:
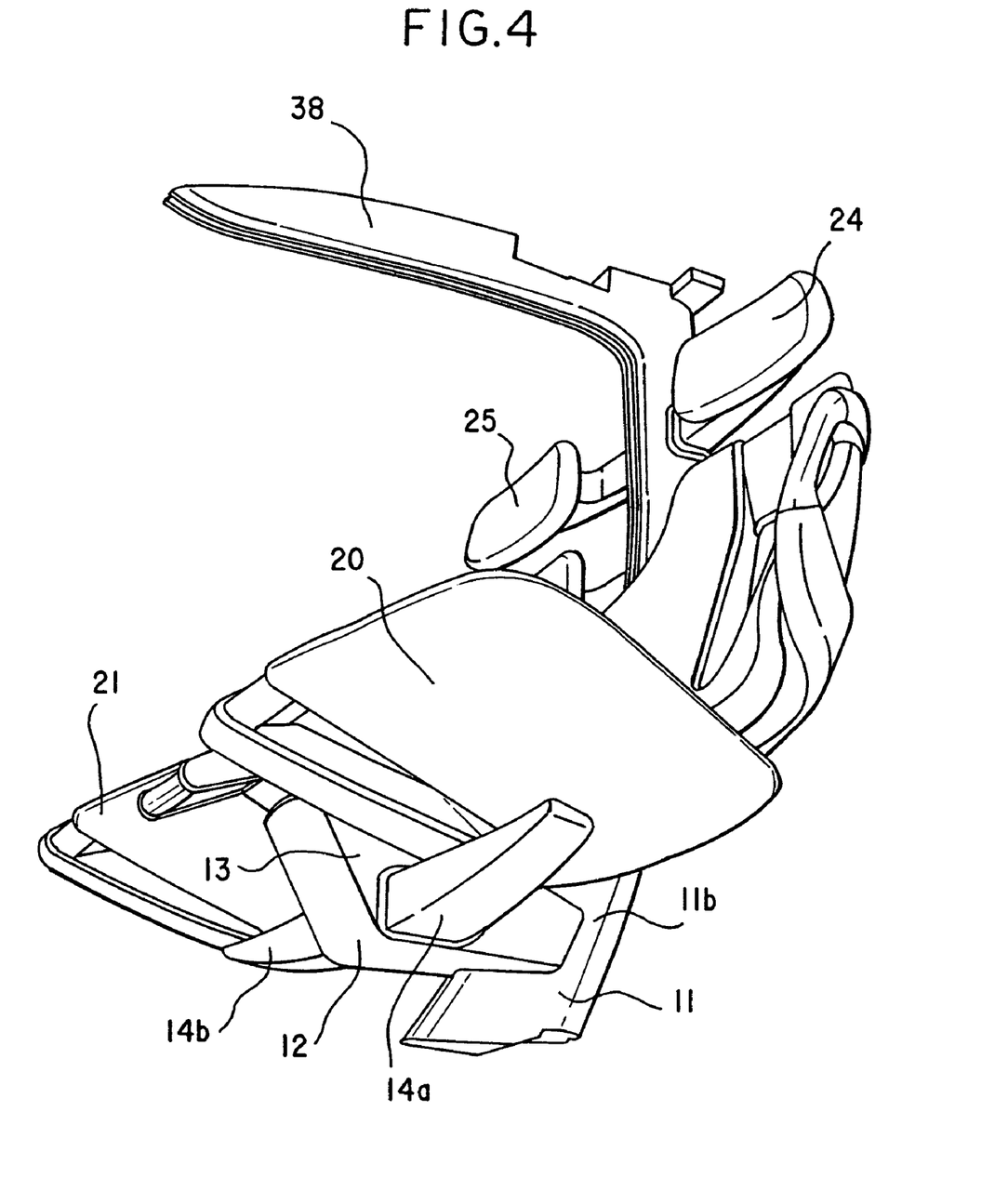
FIG. 4 is a perspective view of the seats, as viewed from below.

As best illustrated in FIGS. 3 and 4, a center support 12 extends generally forwardly from central pillar 11 at a lower portion 11b thereof. Center support 12 extends forwardly and provides a side surface 13 (on each side thereof) from which left and right lower ribs 14a, 14b extend laterally outwardly. Lower left and right ribs 14a, 14b support left and right seat bottoms 20, 21, respectively.

Figure 5:
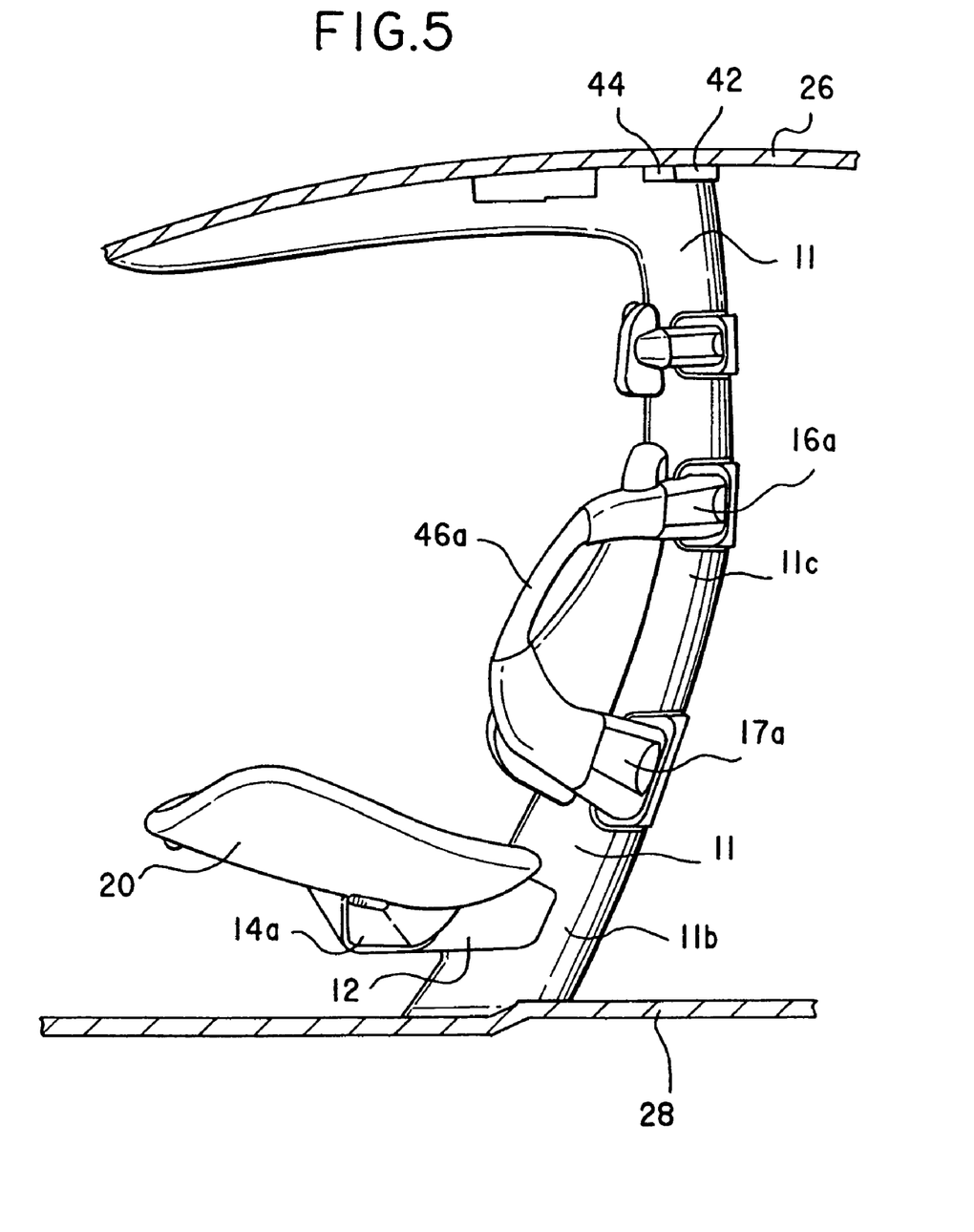
FIG. 5 is a side view of the seats.
Figure 7:
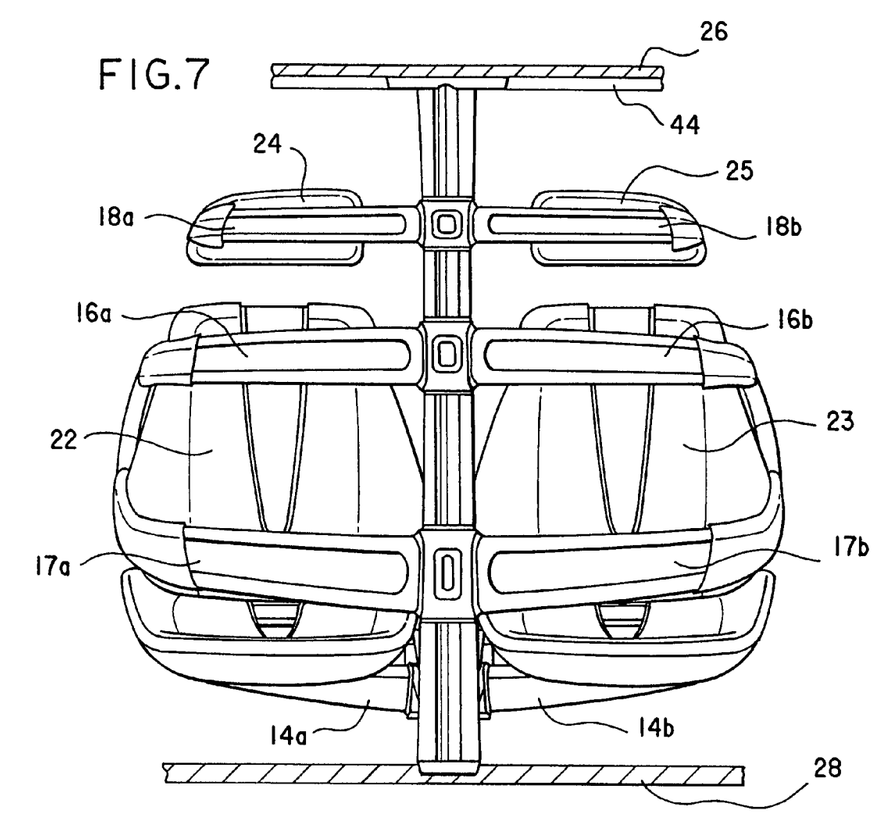
FIG. 7 is a rear view of the seats.

As best illustrated in FIGS. 3, 5 and 7, left and right primary intermediate ribs 16a and 16b extend laterally outwardly from a generally central portion 11c of central pillar 11. Left and right secondary intermediate ribs 17a, 17b also extend outwardly and laterally from central pillar 11. Left and right secondary intermediate ribs 17a, 17b are spaced apart from primary intermediate ribs 16a, 16b and downwardly therefrom with respect to central pillar 11. Primary intermediate ribs 16a, 16b and secondary intermediate ribs 17a, 17b together are fixed to and support left and right seat backs 22 and 23, respectively.

Left and right upper ribs 18a and 18b extend outwardly and laterally from central pillar 11, disposed at a location above primary intermediate ribs 16a, 16b. Left and right upper ribs 18a, 18b are fixed to and support headrests 24 and 25, respectively.

Figure 2:
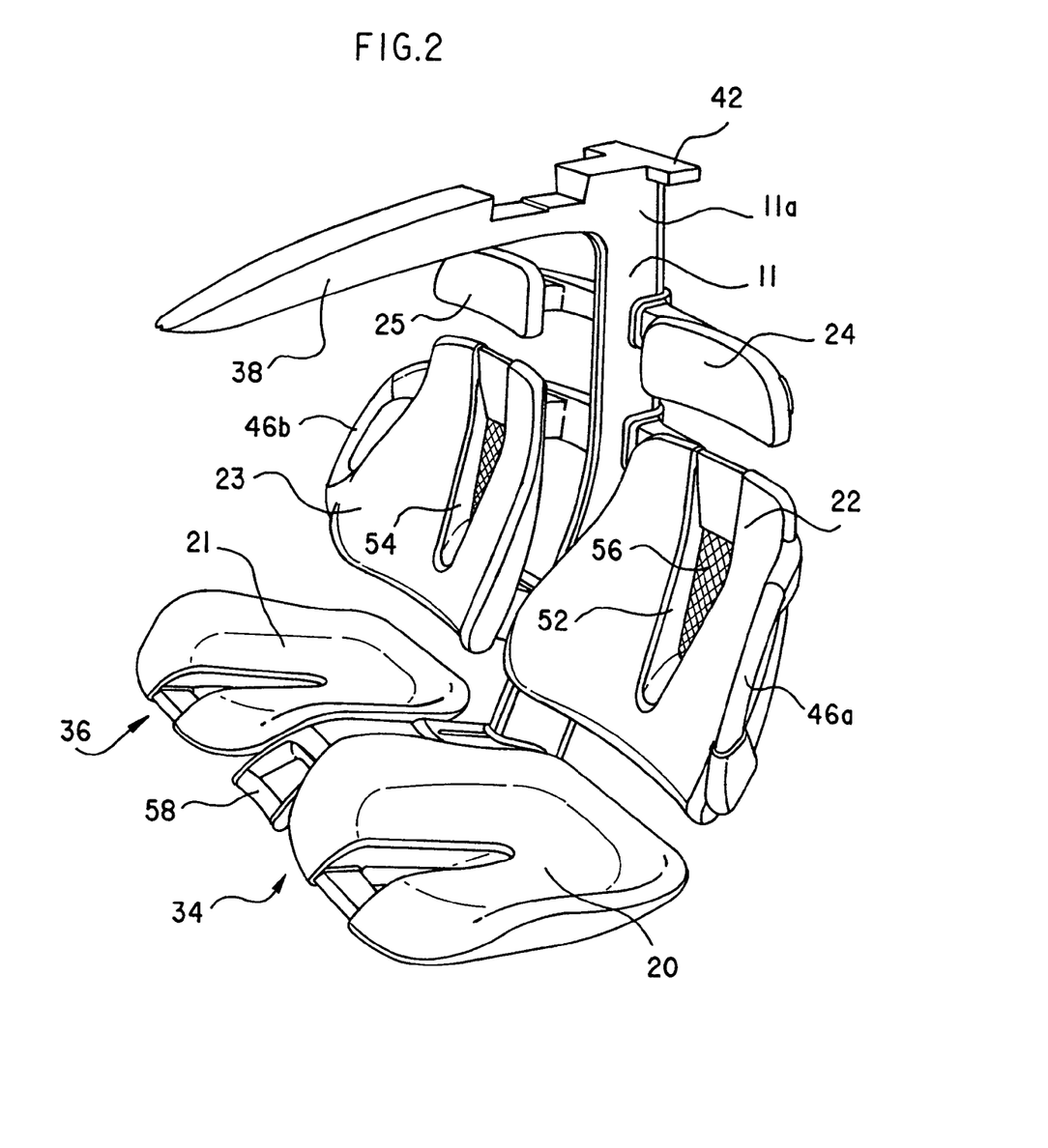
FIG. 2 is a front perspective view of the seats of FIG. 1.

As best seen in FIGS. 2, 3 and 5, grab handles 46a and 46b are provided on seat backs 22 and 23, respectively. For example, seat back 22 has a grab handle 46a disposed on an outer edge thereof, that is, an edge nearest the vehicle door. As illustrated in FIGS. 3 and 5, grab handle 46a has opposing ends, each of which is supported by one of the left primary intermediate rib 16a and the left secondary intermediate rib 17a. Grab handles 46a and 46b also serve to help entry and exit of passenger in seats behind vehicle seats 34 and 36.

As illustrated in FIGS. 5 and 7, across member 44 extends laterally across the roof of the vehicle and is fixed to upper portion 11a of central pillar 11. This provides additional structural support for the vehicle.

Figure 6:
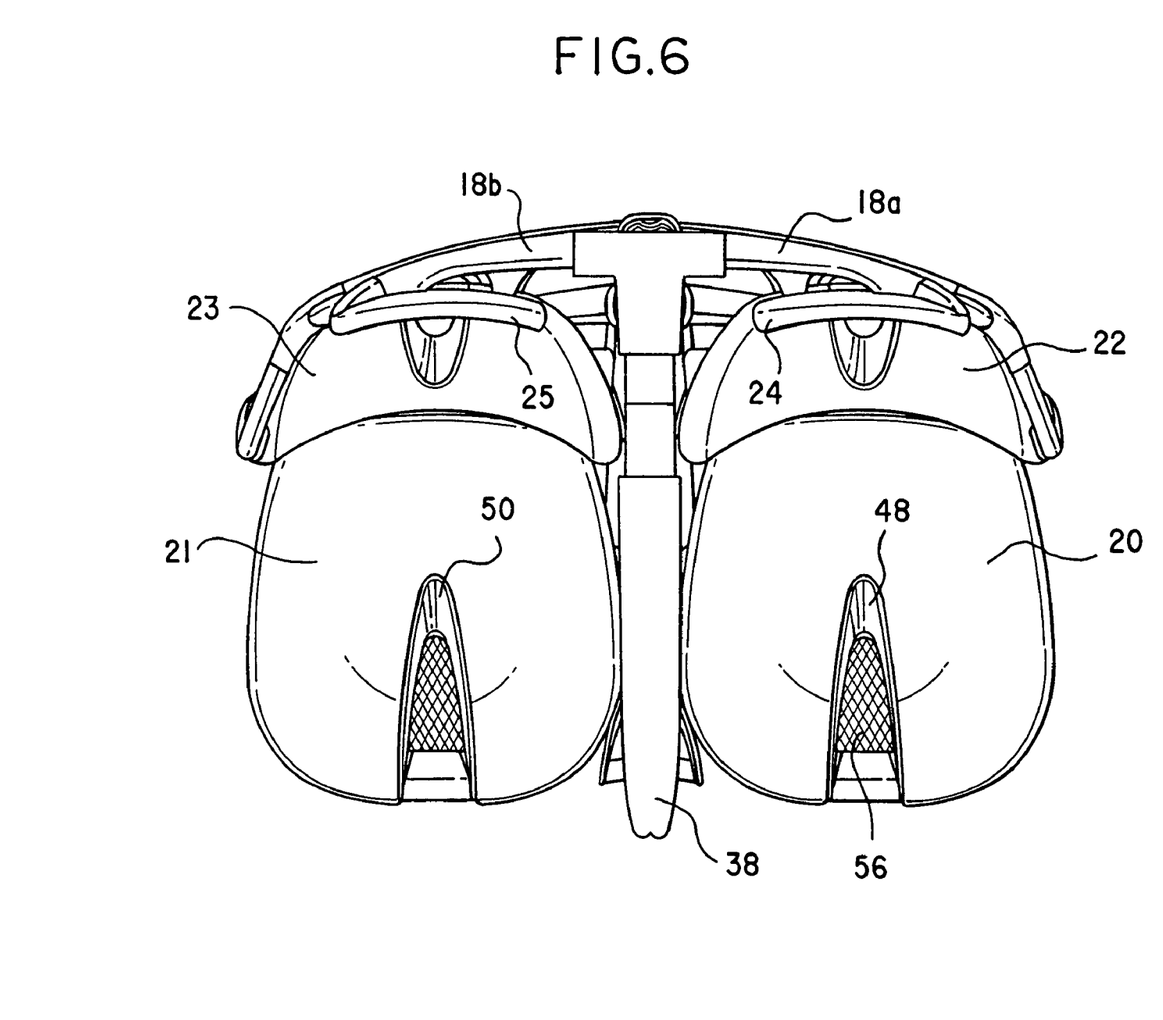
FIG. 6 is a top plan view of the seats.

FIG. 6 illustrates left and right openings 48 and 50 in a front portion of seat bottoms 20 and 21, respectively. Openings 48 and 50 are provided with mesh fabric 56 therein. Furthermore, seat bottoms 20 and 21 are preferably provided with a breathable type of fabric. The breathable fabric and the mesh filled openings help the seats to breath better in order to be more comfortable. FIG. 2 illustrates mesh 56 disposed in left and right openings 52 and 54 of seat backs 22 and 23. Similarly, seat backs 22 and 23 are preferably covered with a breathable fabric, thus, providing better circulation of air in conjunction with mesh 56.

As illustrated in FIG. 2, hand brake lever (or handle) 58 is supported by and extends from a forward portion of center support 12. As illustrated in FIG. 3, the upper ribs and the primary and secondary intermediate ribs may be adjustable along channel 60 of central pillar 11. However, since seat bottoms 20 and 21 (driver seats for either left hand drive or right hand drive arrangements) have no tore and aft adjustments, the instrument cluster, pedals and steering wheel are adjustable.

Figure 8:
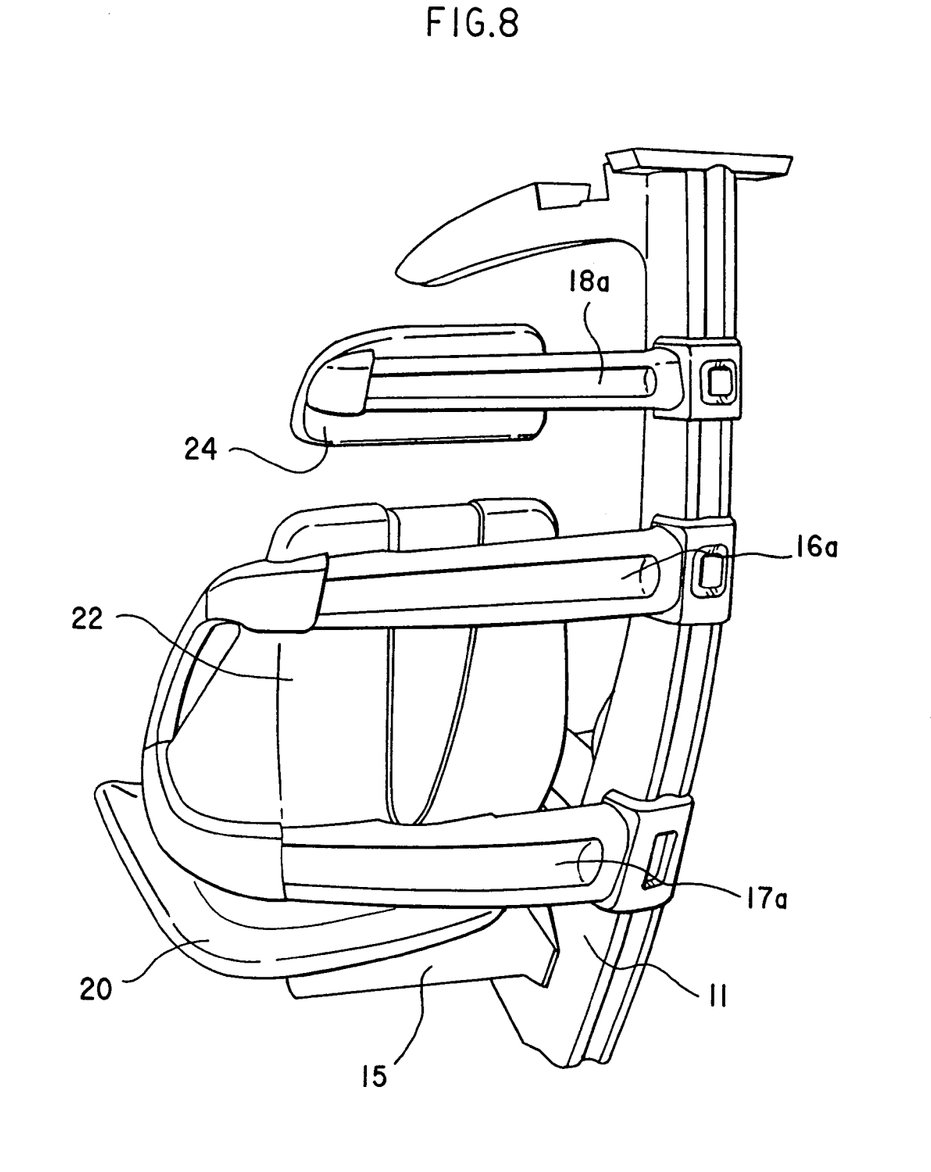
FIG. 8 is a rear perspective view of an alternate version of a single seat.

FIG. 8 illustrates a version of the instant invention in which seat bottom 20 is supported directly by a left lower stand alone rib 15. While FIG. 8 illustrates only a single seat, it is clear that the structure of FIG. 8 also applies to both seats of a pair. It should also be noted that a pillar which supports the ribs need not be in the center of the vehicle and may be located at some other position.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A seat adapted for use in a vehicle having a floor and a roof, comprising:
    a central pillar extending from the floor to the roof of the vehicle;
    a center support extending forwardly from said central pillar;
    a lower rib extend laterally from said center support;
    a seat bottom directly fixed to and supported by said lower rib;
    a primary intermediate rib extending laterally from said central pillar; and
    a seat back fixed to and supported by said intermediate rib.

2. The seat for a vehicle of claim 1, further comprising:
    an upper rib extending laterally from said central pillar above said intermediate rib; and
    a headrest fixed to and supported by said upper rib.

3. The seat for a vehicle of claim 2 further comprising:
    a secondary intermediate rib extending laterally from said central pillar and also fixed to and supporting said seat back.

4. The seat for a vehicle of claim 1, wherein said central pillar includes a support member extending forwardly from an upper portion thereof and fixed to the roof of the vehicle.

5. The seat for a vehicle of claim 1, wherein said primary intermediate and upper ribs are adjustable along said central pillar.

6. The seat for a vehicle of claim 1, wherein said seat back includes a grab handle on an outer edge thereof, nearest a door of the vehicle.

7. The seat for a vehicle of claim 1, further comprising:
    a secondary intermediate rib extending laterally from said pillar and also fixed to and supporting said seat back, said seat back including a grab handle disposed on an outer edge thereof, nearest a door of the vehicle, wherein said grab handle has opposing ends, each end supported by one of said intermediate ribs.

8. The seat for a vehicle of claim 1, wherein said seat is a front seat of the vehicle.

9. The seat for a vehicle of claim 1, further comprising a hand brake lever supported by and extending from a forward end of said center support.

10. The seat for a vehicle of claim 1, wherein said seat bottom has an opening at a central front portion thereof.

11. The seat for a vehicle of claim 10, wherein said opening is covered with a mesh like fabric.

12. The seat for a vehicle of claim 1, wherein said seat back has an opening at a central top portion thereof.

13. The seat for a vehicle of claim 12, wherein said opening is covered with a mesh like fabric.

14. A pair of seats for a vehicle having a floor and a roof, comprising:
    a central pillar extending from the floor to the roof of the vehicle;
    a center support extending forwardly from said central pillar;
    left and right lower ribs extending outwardly from said center support;
    a pair of seat bottoms, each seat bottom directly fixed to and supported by one of said lower ribs;
    left and right primary intermediate ribs extending outwardly from said center pillar; and
    left and right seat backs fixed to and supported by respective left and right intermediate ribs.

15. The pair of seats for a vehicle of claim 14, further comprising:
    left and right upper ribs extending outwardly from said central pillar; and
    left and right headrests fixed to and supported by respective left and right upper ribs.

16. The pair of seats for a vehicle of claim 14, further comprising:

secondary left and right intermediate ribs extending outwardly from said central pillar and spaced apart downwardly therefrom, each of said secondary left and right intermediate ribs also fixed to and supporting said respective left and right seat backs.

17. The pair of seats for a vehicle of claim 16, further comprising:
    left and right upper ribs extending outwardly from said central pillar; and
    left and right headrests fixed to and supported by said respective left and right upper ribs.

18. The pair of seats for a vehicle of claim 16, further comprising left and right grab handles, each formed on an outer edge of said respective left and right seat backs.

19. The pair of seats for a vehicle of claim 18, wherein each of said left and right grab handles has opposing ends, each end supported by one of said respective left or right intermediate ribs.

20. The pair of seats for a vehicle of claim 14, wherein said pair of seats are front seats of the vehicle.

21. A pair of seats for a motor vehicle having a roof and a floor, comprising:
    a central pillar extending from the floor to the roof of the motor vehicle;
    a center support extending forwardly substantially along a center line of the motor vehicle;
    left and right lower ribs extending outwardly from said center support on opposite sides thereof;
    left and right seats fixed to and supported by said respective left and right lower ribs;
    left and right primary intermediate ribs extending outwardly from said central pillar, on opposite sides thereof;
    left and right secondary intermediate ribs extending outwardly from said central pillar, on opposite sides thereof, and spaced from said respective left and right primary intermediate ribs, downwardly along said central pillar;
    left and right upper ribs extending outwardly from said central pillar, on opposite sides thereof; and
    left and right headrests fixed to and supported by said respective left and right upper ribs.

22. The pair of front seats for a motor vehicle of claim 21, further comprising:
    left and right grab handles, each disposed on an outer edge of said respective left and right seat backs.

23. The pair of front seats for a motor vehicle of claim 22, wherein said left and right grab handles each has opposing ends, wherein each end of each grab handle is supported by a corresponding one of said primary and secondary intermediate ribs.

24. The pair of front seats for a motor vehicle of claim 21, further comprising a hand brake lever supported by and extending from a forward end of said center support.

25. A seat adapted for use in a vehicle having a floor and a roof, comprising:
    a pillar extending from the floor to the roof of the vehicle;
    a center support extending forwardly from said pillar;
    a lower rib extend laterally from said center support;
    a seat bottom fixed to and supported by said lower rib;
    a primary intermediate rib extending laterally from said pillar; and
    a seat back fixed to and supported by said intermediate rib.

26. The seat for a vehicle of claim 25, further comprising:
    an upper rib extending laterally from said pillar above said intermediate rib; and
    a headrest fixed to and supported by said upper rib.

27. The seat for a vehicle of claim 26, further comprising:
    a secondary intermediate rib extending laterally from said pillar and also fixed to and supporting said seat back.

* * * * *